(12) United States Patent
Zeng et al.

(10) Patent No.: US 11,050,128 B2
(45) Date of Patent: Jun. 29, 2021

(54) SECONDARY BATTERY AND METHOD OF MANUFACTURING THE SECONDARY BATTERY

(71) Applicant: Contemporary Amperex Technology Co., Limited, Ningde (CN)

(72) Inventors: Yuqun Zeng, Ningde (CN); Fenggang Zhao, Ningde (CN); Yong Zhou, Ningde (CN); Zhijun Guo, Ningde (CN); Peng Wang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 23 days.

(21) Appl. No.: 16/666,749

(22) Filed: Oct. 29, 2019

(65) Prior Publication Data

US 2020/0144584 A1    May 7, 2020

(30) Foreign Application Priority Data

Nov. 7, 2018    (CN) .......................... 201811320144.X

(51) Int. Cl.
    *H01M 2/30*    (2006.01)
    *H01M 2/06*    (2006.01)
    (Continued)

(52) U.S. Cl.
CPC ....... *H01M 50/543* (2021.01); *H01M 50/172* (2021.01); *H01M 50/531* (2021.01);
(Continued)

(58) Field of Classification Search
CPC .. H01M 2220/20; H01M 2/0473; H01M 2/06; H01M 2/22; H01M 2/26; H01M 2/30; Y02E 60/10
See application file for complete search history.

(56) References Cited

U.S. PATENT DOCUMENTS 9,461,296 B2    10/2016    Kohno et al.
2014/0030587 A1*  1/2014    Tsuruta ................... H01M 2/30
                                                           429/179

(Continued)

FOREIGN PATENT DOCUMENTS

| CN | 207233789 U | 4/2018 |
|---|---|---|
| EP | 2500964 A2 | 9/2012 |
| EP | 2613377 A1 | 7/2013 |

OTHER PUBLICATIONS

The Extended European search report dated Mar. 26, 2020 for European application No. 19206310.5, 8 pages.

*Primary Examiner* — Lingwen R Zeng
(74) *Attorney, Agent, or Firm* — Law Offices of Liaoteng Wang

(57) ABSTRACT

The present disclosure relates to a secondary battery and a manufacturing method of the secondary battery, and the secondary battery includes a case; an electrode assembly, accommodated in the case and including a main body and a tab connected to the main body; a cap plate, coupled to the case; an electrode terminal, located on an outer side of the cap plate and provided with a through hole; and a current collecting member, including an extending portion and a connecting portion connected to the extending portion, wherein the connecting portion is located on an inner side of the cap plate and is directly connected to the tab, and the extending portion is adapted to extend toward the electrode terminal and protrude into the through hole, and is connected to the electrode terminal. The configuration of the secondary battery of the present disclosure is conducive to improving an energy density.

17 Claims, 11 Drawing Sheets

(51) Int. Cl.
  *H01M 2/26*    (2006.01)
  *H01M 50/543*  (2021.01)
  *H01M 50/172*  (2021.01)
  *H01M 50/531*  (2021.01)
  *H01M 50/15*   (2021.01)
  *H01M 50/528*  (2021.01)

(52) U.S. Cl.
  CPC .......... *H01M 50/15* (2021.01); *H01M 50/528* (2021.01); *H01M 2220/20* (2013.01); *Y02E 60/10* (2013.01)

(56) References Cited

U.S. PATENT DOCUMENTS

| | | | |
|---|---|---|---|
| 2015/0086867 A1* | 3/2015 | Oda | H01M 2/206 429/211 |
| 2015/0243935 A1* | 8/2015 | Minagata | H01M 2/08 429/179 |
| 2016/0276645 A1 | 9/2016 | Koo | |
| 2016/0359159 A1 | 12/2016 | Yoo et al. | |
| 2018/0233714 A1 | 8/2018 | Guo et al. | |

* cited by examiner providing an electrode assembly including a main body and a tab connected to the main body

providing a current collecting member including an extending portion and a connecting portion connected to the extending portion, and directly connecting the tab to the connecting portion

providing a cap plate and an electrode terminal disposed on an outer side of the cap plate and provided with a through hole, and inserting the extending portion into the through hole from an inner side of the cap plate

providing a case, loading the electrode assembly into the case, connecting the cap plate and the case in a sealed manner, and performing laser welding on the outer side of the cap plate to connect the extending portion and the electrode terminal

Fig. 16

SECONDARY BATTERY AND METHOD OF MANUFACTURING THE SECONDARY BATTERY

CROSS REFERENCE TO RELATED APPLICATION

This application claims priority to Chinese Patent Application No. 201811320144.X, filed on Nov. 7, 2018, which is hereby incorporated by reference in its entirety.

TECHNICAL FIELD

The present disclosure relates to a technical filed of batteries, and particularly relates to a secondary battery and a method of manufacturing the secondary battery.

BACKGROUND

New energy vehicles are widely promoted in China and the world, but there are still many improvements that need to be made to completely replace fuel vehicles with the new energy vehicles. For example, problems, such as small driving distance, high cost of a battery pack, and low reliability of the battery pack needs to be further solved. In view of the above problems, higher requirements have been placed on secondary batteries, core parts of electric vehicles, for example, the secondary batteries are required to have higher energy density, lower cost, and the like.

In the prior art, the secondary battery includes a case, an electrode assembly disposed in the case, a cap plate coupled to the case, and an electrode terminal disposed on the cap plate. The cap plate is provided with a mounting hole, and the electrode terminal is mounted in the mounting hole, with a part located on an outer side of the cap plate, and a part located on an inner side of the cap plate. Both of the part of the electrode terminal located on the outer side of the cap plate and the part of the electrode terminal located on the inner side of the cap plate extend beyond the mounting hole in a radial direction of the mounting hole, so as to fix the electrode terminal to the cap plate. In this case, since a part of the electrode terminal is located on the inner side of the cap plate, the electrode terminal occupies some space in the case. As a result, a gap between the electrode assembly and the cap plate is too large to fully utilize the space in the case, thereby causing a low energy density of the entire secondary battery.

SUMMARY

The embodiments of the present disclosure provide a secondary battery and a manufacturing method thereof. The configuration of the secondary battery is conducive to improvement of energy density.

On one aspect, the embodiment of the present disclosure discloses a secondary battery, including: a case; an electrode assembly, accommodated in the case and including a main body and a tab connected to the main body; a cap plate, coupled to the case; an electrode terminal, located on an outer side of the cap plate and provided with a through hole; and a current collecting member, including an extending portion and a connecting portion connected to the extending portion, wherein the connecting portion is located on an inner side of the cap plate and is directly connected to the tab, and the extending portion is adapted to extend toward the electrode terminal and protrude into the through hole, and is connected to the electrode terminal.

According to one aspect of the present disclosure, the extending portion includes a projection and a recess, wherein the projection is connected to the connecting portion and the recess is formed on a side of the projection facing away from the electrode terminal by forming the projection.

According to one aspect of the present disclosure, the projection includes a base portion and a side portion, wherein the side portion is connected to the connecting portion and is adapted to extend toward the electrode terminal, and the base portion is connected to one end of the side portion away from the connecting portion, and is adapted to protrude into the through hole and is connected to the electrode terminal.

According to one aspect of the present disclosure, the side portion is formed in a cylindrical shape and is connected to the base portion in a sealed manner, and the base portion is directly connected to the electrode terminal.

According to one aspect of the present disclosure, the base portion is welded to the electrode terminal, by which an annular welding seam is formed to connect the base portion and the electrode terminal in a sealed manner.

According to one aspect of the present disclosure, the base portion includes a base body and an annular flange connected between the side portion and the base body, wherein the base body is adapted to protrude into the through hole, and is directly connected to the electrode terminal with the annular flange abutting against the electrode terminal.

According to one aspect of the present disclosure, the projection includes a base portion and a side portion, wherein the side portion is connected to the connecting portion and is adapted to extend toward the electrode terminal, and the base portion is connected to one end of the side portion away from the connecting portion; and the extending portion further includes a connecting member, wherein the base portion is provided with a perforation hole, the connecting member is adapted to pass through the perforation hole and connect to the base portion, and is further adapted to protrude into the through hole and is directly connected to the electrode terminal.

According to one aspect of the present disclosure, the connecting member includes a support portion and a column body connected to the support portion, wherein the support portion is received in the recess of the extending portion and is adapted to extend beyond an inner wall of the perforation hole in a radial direction of the perforation hole, and the column body is adapted to pass through the perforation hole and protrude into the through hole, and is directly connected to the electrode terminal.

According to one aspect of the present disclosure, the base portion is in direct contact with the electrode terminal, and in direct contact with the support portion.

According to one aspect of the present disclosure, the column body is welded to the electrode terminal, by which an annular welding seam is formed to connect the column body and the electrode terminal in a sealed manner.

According to one aspect of the present disclosure, the connecting portion is formed as a sheet-like member, and is connected to the tab by ultrasonic welding; and the extending portion is connected to the electrode terminal by laser welding.

According to one aspect of the present disclosure, the tab includes a weld portion and a bent portion, wherein the bent portion is connected between the main body of the electrode assembly and the weld portion, and is bent downward with respect to the weld portion; and the secondary battery includes two groups of electrode assemblies, wherein each weld portion of the two groups of electrode assemblies is welded to the connecting portion of the current collecting member by ultrasonic welding, and the weld portion of either one of the two groups of electrode assemblies is adapted to extend toward the weld portion of the other group of the electrode assembly.

According to one aspect of the present disclosure, the electrode terminal includes a second metal layer and a first metal layer stacked on the second metal layer, and the through hole is formed as a stepped hole including a first hole and a second hole, wherein the first hole has an aperture larger than that of the second hole, the first hole is disposed in the first metal layer, and the second hole is disposed in the second metal layer; and the extending portion and the second metal layer are made of the same material, the first metal layer and the second metal layer are made of different materials, and the extending portion is adapted to protrude into the second hole and is connected to the second metal layer.

According to one aspect of the present disclosure, the through hole includes a stepped surface, and a top surface of the extending portion is flush with the stepped surface.

According to one aspect of the present disclosure, the electrode terminal includes a first metal layer and a second metal layer, wherein the first metal layer is provided with a groove on an upper surface, and the second metal layer is disposed in the groove and connected to the first metal layer; and the first metal layer and the second metal layer are made of different materials, and the extending portion is connected to the second metal layer and has the same material as the second metal layer.

According to one aspect of the present disclosure, the first metal layer is made of aluminum, the second metal layer is made of copper, and the extending portion is made of copper.

On a further aspect, the embodiments of the present disclosure discloses a method of manufacturing a secondary battery, and the method includes steps of: providing an electrode assembly, wherein the electrode assembly includes a main body and a tab connected to the main body; providing a current collecting member, wherein the current collecting member includes an extending portion and a connecting portion connected to the extending portion, and the tab is directly connected to the connecting portion; providing a cap plate and an electrode terminal, wherein the electrode terminal is disposed on an outer side of the cap plate and is provided with a through hole, and the extending portion is adapted to protrude into the through hole from an inner side of the cap plate; and providing a case, loading the electrode assembly into the case, and then performing laser welding on the outer side of the cap plate to connect the extending portion and the electrode terminal.

BRIEF DESCRIPTION OF THE DRAWINGS

Features, advantages, and technical effects of the present disclosure will be described below with reference to accompanying drawings.

FIG. 16 is a flow chart of a method of manufacturing a secondary battery according to an embodiment of the present disclosure.

Figure 1:
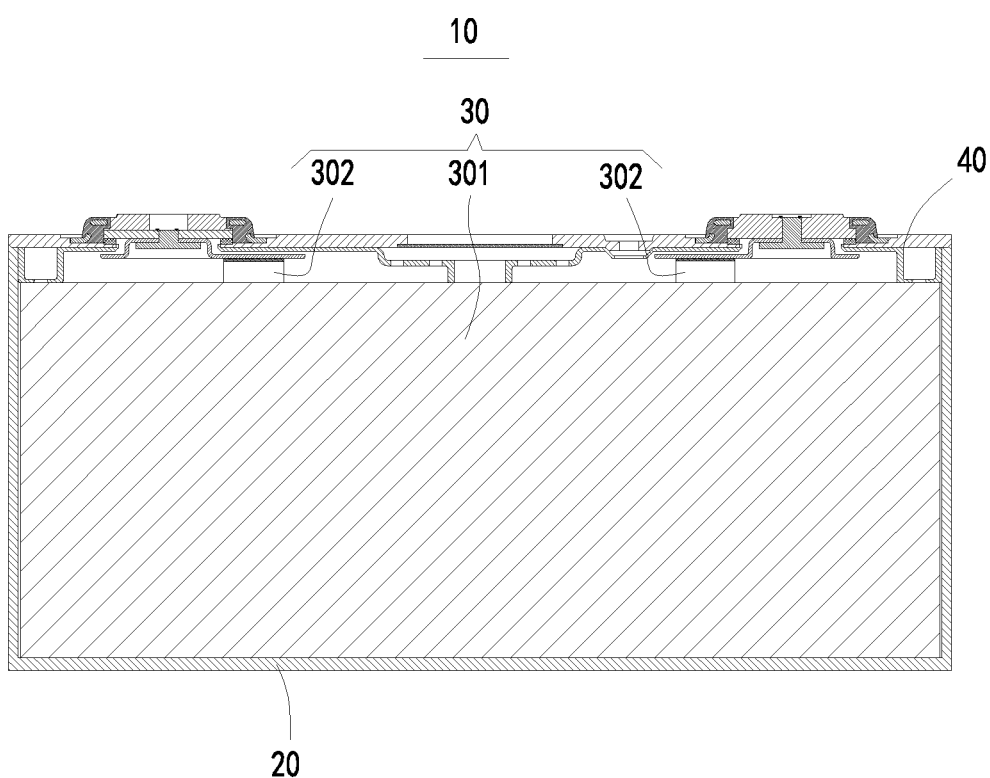
FIG. 1 schematically shows a cross-sectional view of a secondary battery according to an embodiment of the present disclosure.

In the drawings, the drawings are not drawn to scale.

REFERENCE NUMERALS 10, secondary battery;
20, case;
30, electrode assembly; 301, main body; 302, tab; 302a, weld portion; 302b, bent portion;
40, cap assembly;
50, cap plate; 501, electrode lead-out hole;
60, electrode terminal; 601, through hole; 601a, first hole; 601b, second hole; 602, a second metal layer; 603, a first metal layer;
70, current collecting member; 70a, extending portion; 70b, connecting portion; 701, projection; 701a, base portion; 7011, base body; 7012, annular flange; 701b, side portion;
702, recess; 703, connecting member; 703a, support portion; 703b, column body; 704, annular body;
80, insulating member;
90, sealing member.

DETAILED DESCRIPTION

Below, embodiments of the present disclosure will be further described in detail with reference to the accompanying drawings and embodiments. The detailed description of the embodiments and the accompanying drawings are intended to exemplarily illustrate the principles of the present disclosure and are not intended to limit the scope of the present disclosure. That is, the present disclosure is not limited to the described embodiments.

In the description of the present disclosure, it should be noted that, unless otherwise stated, the meaning of "a plurality of" is two or more; the orientation or positional relationship indicated by the terms "upper", "lower", "left", "right", "inner", "outer", "front end", "rear end", "head", "tail" or the like is merely for the purpose of describing the present disclosure and simplifying the description, and is not intended to indicate or imply that the device or component referred to has a particular orientation, is constructed and operated in a particular orientation, and therefore cannot be understood to be a limitation of the present disclosure. Moreover, the terms "first", "second", "third" and the like are used for descriptive purposes only and are not to be construed as indicating or implying relative importance.

In the description of the present disclosure, it should be noted that, unless otherwise clearly stated and defines, the terms "installation", "couple", and "connection" are to be understood broadly, and may be, for example, a fixed connection, a disassemble connection, or an integral connection, and may be direct connection or indirect connection through an intermediate medium. The specific meaning of the above terms in the present disclosure may be understood by the person skilled in the art according to actual circumstance.

In order to better understand the present disclosure, a secondary battery 10 according to an embodiment of the present disclosure will be described in detail below with reference to FIGS. 1-14.

Referring to FIG. 1, the secondary battery 10 according to an embodiment of the present disclosure includes a case 20, an electrode assembly 30 disposed within the case 20, and a cap assembly 40 connected to the case 20 in a sealed manner.

The case 20 of the present embodiment may be formed in a hexahedral shape or in other shapes. The case 20 has an internal space for accommodating the electrode assembly 30 and electrolyte. The case 20 may be made of a material such as aluminum, aluminum alloy, or plastic.

The electrode assembly 30 of the present embodiment may include a main body 301, which is formed by stacking or winding a first electrode plate, a second electrode plate and a separator together, wherein the separator is an insulator interposed between the first electrode plate and the second electrode plate. In the present embodiment, description is made by exemplarily taking the first electrode plate as a positive electrode plate, and taking the second electrode plate as a negative electrode plate. Similarly, in other embodiments, the first electrode plate is a negative electrode plate, and the second electrode plate is a positive electrode plate. Further, a positive active material is coated on a coating region of the positive electrode plate, and a negative active material is coated on a coating region of the negative electrode plate. Uncoated region extending out from the main body 301 serves as a tab 302. The electrode assembly 30 includes two tabs 302, that is, a positive tab and a negative tab, wherein the positive tab extends out from the coated region of the positive electrode plate, and the negative tab extends out from the coated region of the negative electrode plate.

Figure 2:
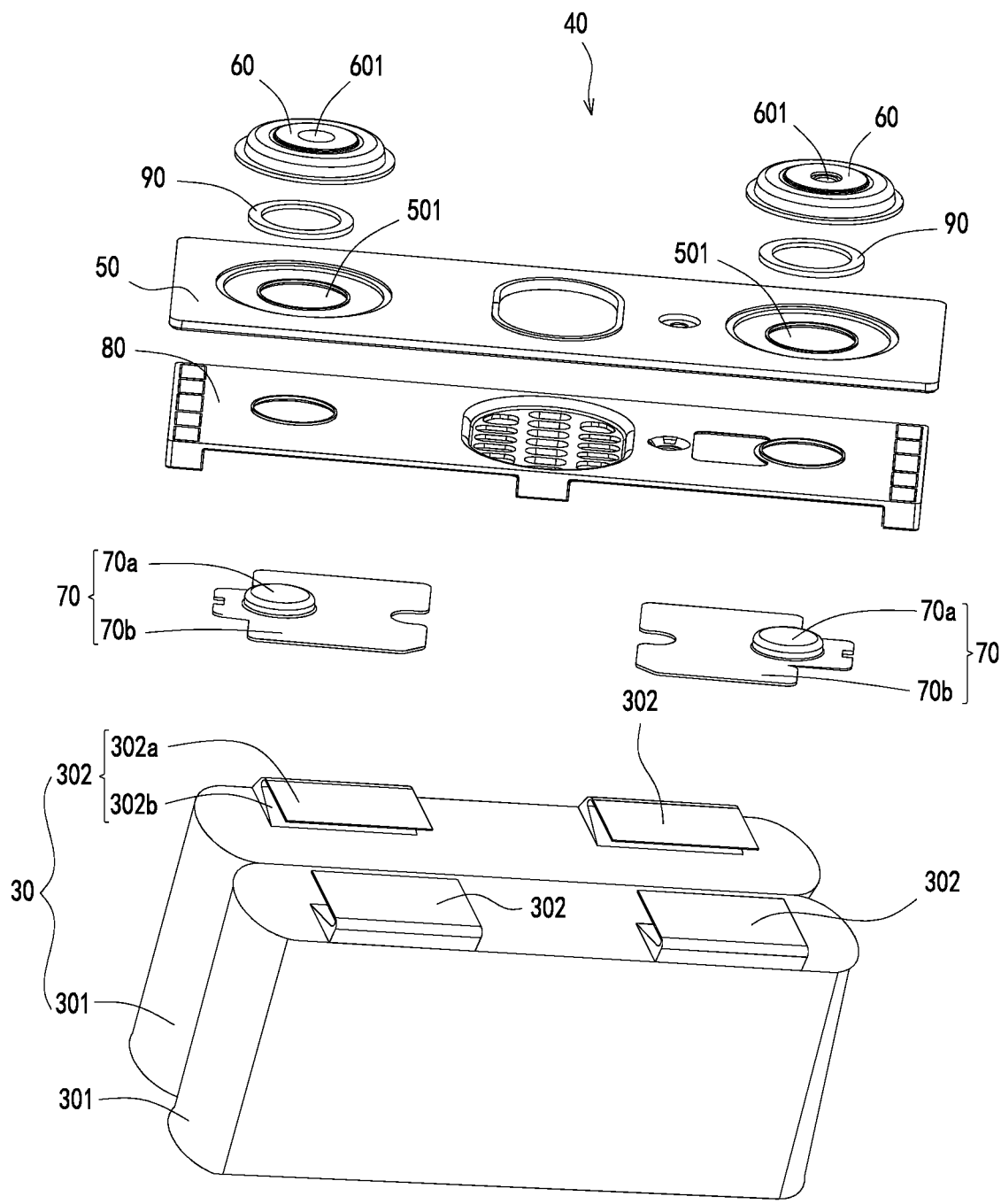
FIG. 2 schematically shows a partial exploded view of a secondary battery according to the embodiment of the present disclosure.
Figure 3:
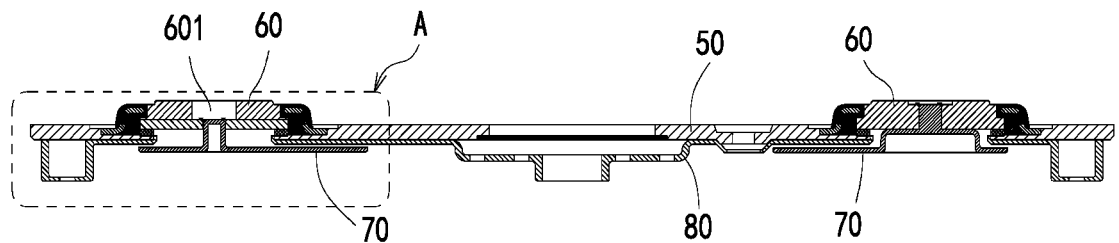
FIG. 3 schematically shows a cross-sectional view of a cap assembly according to the embodiment of the present disclosure.
Figure 4:
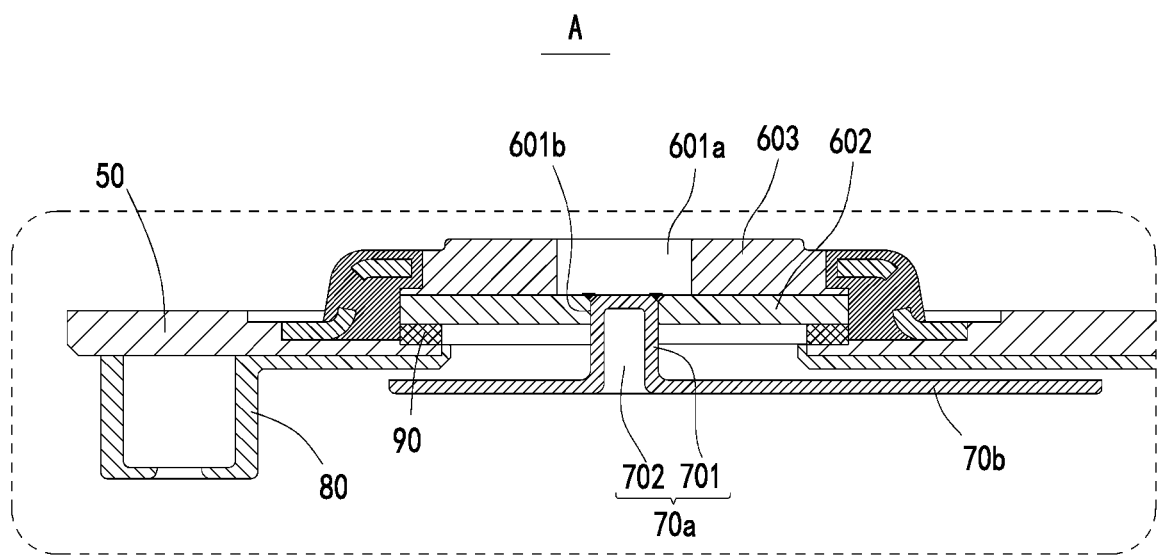
FIG. 4 schematically shows a partial enlarged view of portion A in FIG. 3.

FIG. 2 schematically shows a partial exploded view of a secondary battery according to an embodiment of the present disclosure. FIG. 3 schematically shows a cross-sectional view of a cap assembly according to an embodiment of the present disclosure. FIG. 4 schematically shows a partial enlarged view of portion A in FIG. 3. Referring to FIGS. 2 to 4, the cap assembly 40 of the present embodiment includes a cap plate 50 coupled to the case 20 in a sealed manner, an electrode terminal 60 disposed on the cap plate 50, and a current collecting member 70 connected to the electrode terminal 60. The cap plate 50 of the present embodiment is provided with an electrode lead-out hole 501. The electrode terminal 60 of the present embodiment is located on an outer side of the cap plate 50 and has a through hole 601. The through hole 601 of the electrode terminal 60 of the present embodiment is disposed corresponding to the electrode lead-out hole 501 of the cap plate 50. The electrode terminal 60 of the present embodiment is fixed to the cap plate 50. The current collecting member 70 of the present embodiment includes an extending portion 70a and a connecting portion 70b connected to the extending portion 70a. The connecting portion 70b is located on an inner side of the cap plate 50 and directly connected to the tab 302 of the electrode assembly 30. Preferably, the connecting portion 70b is formed in a shape of sheet, and the connecting portion 70b is connected to the tab 302 by ultrasonic welding. The extending portion 70a extends toward the electrode terminal 60 and protrudes into the through hole 601, and is connected to the electrode terminal 60. Preferably, the extending portion 70a and the electrode terminal 60 are connected by laser welding. After protruding into the through hole 601, the extending portion 70a is exposed to a side of the electrode terminal 60 facing away from the cap plate 50, such that laser light may be irradiated from the outer side of the cap plate 50 to connecting positions of the extending portion 70a and the electrode terminal 60, and a portion of the extending portion 70a exposed to the side of the electrode terminal 60 facing away from the cap plate 50 may be connected to the electrode terminal 60 by laser welding. Since the laser light is incident from the outer side of the cap plate 50, metal particles generated by the laser welding will not fall into the inner side of the cap plate 50 (i.e., inside of the case 20), and thus will not cause a short circuit of the electrode assembly 30. That is, a security risk brought by the laser welding may be eliminated.

Referring to FIG. 2, an insulating member 80 is disposed between the cap plate 50 and the electrode assembly 30 according to an embodiment of the present disclosure, to maintain an insulation between the cap plate 50 and the electrode assembly 30. Two opposite ends of the insulating member 80 may abut against the electrode assembly 30 to prevent a movement of the electrode assembly 30 in the case. A sealing member 90 is disposed between the electrode terminal 60 and the cap plate 50, and the sealing member 90 surrounds the electrode lead-out hole 501, so that a sealing between the electrode terminal 60 and the cap plate 50 may be maintained.

The secondary battery 10 according to the embodiment of the present disclosure includes a cap plate 50, an electrode terminal 60 located on an outer side the cap plate 50, and a current collecting member 70 connected to the electrode terminal 60. The current collecting member 70 is connected to the electrode terminal 60 via its own extending portion 70a, and is connected to the tab 302 of the electrode assembly 30 via its own connecting portion 70b. The electrode terminal 60 is too thick to be connected to the tab 302 by ultrasonic welding, and the tab 302 is too thin to be connected to the electrode terminal 60 by laser welding, since the laser may melt through the thin tab 302. By providing the current collecting member 70, the tab 302 may be connected to the current collecting member 70 by ultrasonic welding, and the current collecting member 70 may be connected to the electrode terminal 60 by laser welding. Further, the electrode terminal 60 of the present embodiment does not occupy the space in the case 20, which may effectively improve a utilization rate of the space in the case 20, and thus is conducive to improving an energy density of the entire secondary battery 10. Furthermore, in the present embodiment, it is possible to directly connect the tab 302 of the electrode assembly 30 to the connecting portion 70b of the current collecting member 70 first, then insert the extending portion 70a of the current collecting member 70 into the through hole 601 of the electrode terminal 60, and finally welding the extending portion 70a of the current collecting member 70 to the electrode terminal 60 from the outer side of the cap plate 50 by way of laser welding. In the present embodiment, by using the above connection manner, the possibility that the metal particles generated during laser welding fall into the inside of the case 20, may be effectively lowered.

Referring to FIG. 4, the extending portion 70a of the present embodiment includes a projection 701 and a recess 702. The projection 701 is connected to the connecting portion 70b. The recess 702 is formed on a side of the projection 701 facing away from the electrode terminal 60 by forming the projection 701. Such design of the configuration of the extending portion 70a is advantageous for reducing an overall weight of the current collecting member 70 and improving the energy density of the secondary battery 10. Meanwhile, the recess 702 may accommodate gas generated when the secondary battery is charged or discharged, and thus an internal pressure of the case 20 may be lowered. In one example, the connecting portion 70b, the projection 701, and the recess 702 may be formed by stamping for one time by way of stamping a sheet blank.

Further, the projection 701 of the present embodiment includes a base portion 701a and a side portion 701b. The side portion 701b is connected to the connecting portion 70b and extends toward the electrode terminal 60. The base portion 701a is connected to one end of the side portion 701b away from the connecting portion 70b. The base portion 701a protrudes into the through hole 601 and is connected to the electrode terminal 60.

In one embodiment, referring to FIG. 4, the electrode terminal 60 includes a second metal layer 602 and a first metal layer 603 stacked on the second metal layer 602. The through hole 601 is formed as a stepped hole including a first hole 601a and a second hole 601b, wherein the first hole 601a has an aperture larger than that of the second hole 601b. The first hole 601a is disposed in the first metal layer 603, and the second hole 601b is disposed in the second metal layer 602. The extending portion 70a protrudes into the second hole 601b and is connected to the second metal layer 602. The extending portion 70a and the second metal layer 602 are made of the same material. The first metal layer 603 and the second metal layer 602 are made of different materials. Preferably, the first metal layer 603 is made of aluminum, the second metal layer 602 is made of copper, and the extending portion 70a is made of copper. Since the extending portion 70a of the current collecting member 70 and the second metal layer 602 of the electrode terminal 60 are made of the same material, the extending portion 70a and the second metal layer 602 may be connected and fixed to each other by laser welding, and the welding connection is reliable, stable and has a high strength. In one example, the through hole 601 includes a stepped surface. A top surface of the extending portion 70a is flush with the stepped surface. When the extending portion 70a and the second metal layer 602 are connected and fixed to each other by laser welding, laser light is incident from the outer side of the cap plate 50 in a direction perpendicular to the stepped surface, and melts the extending portion 70a and the second metal layer 602. Since the top surface of the extending portion 70a is flush with the stepped surface, a power requirement of a laser generating apparatus may be advantageously lowered.

Figure 5:
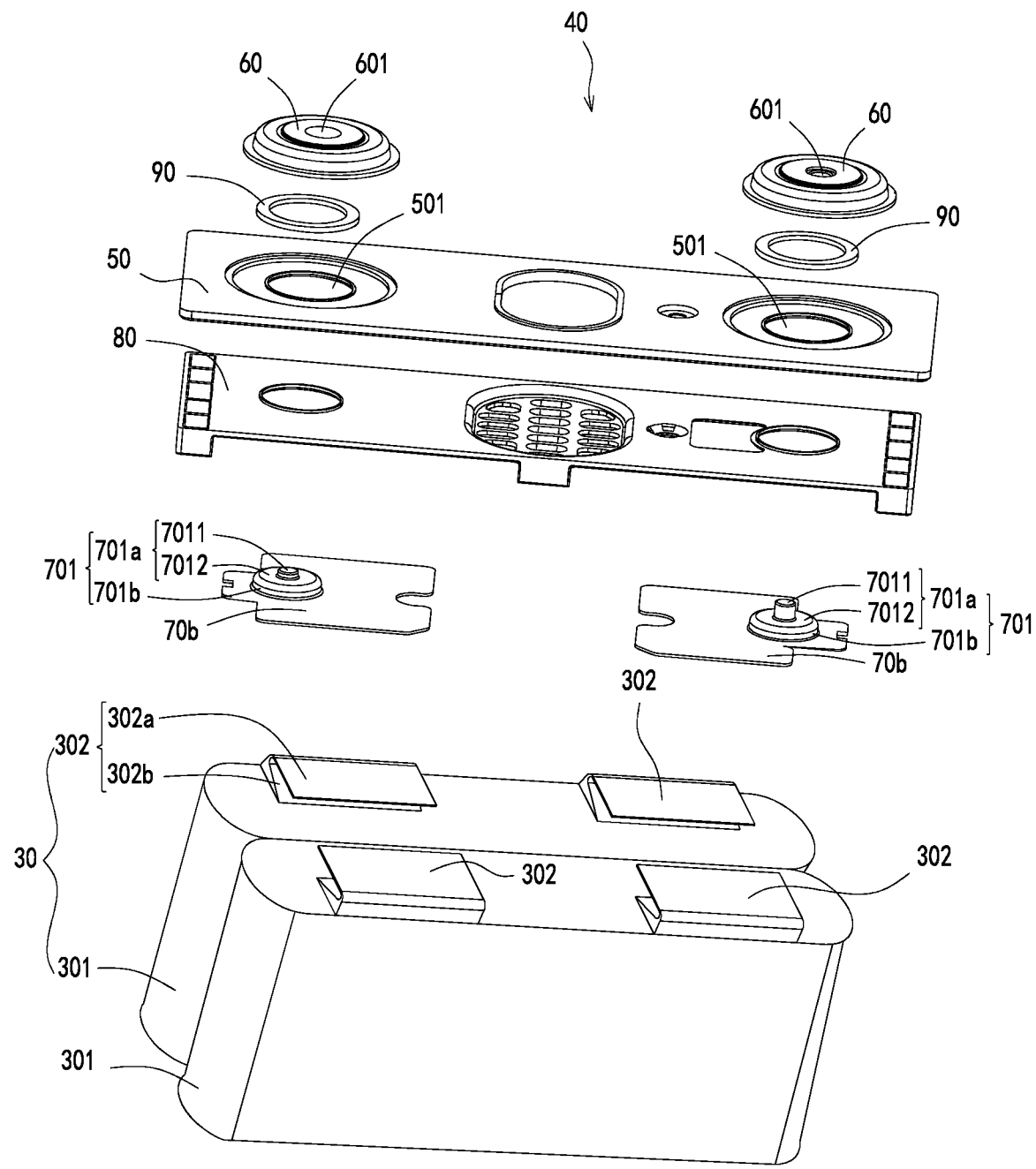
FIG. 5 schematically shows a partial exploded view of a secondary battery according to a further embodiment of the present disclosure.
Figure 6:
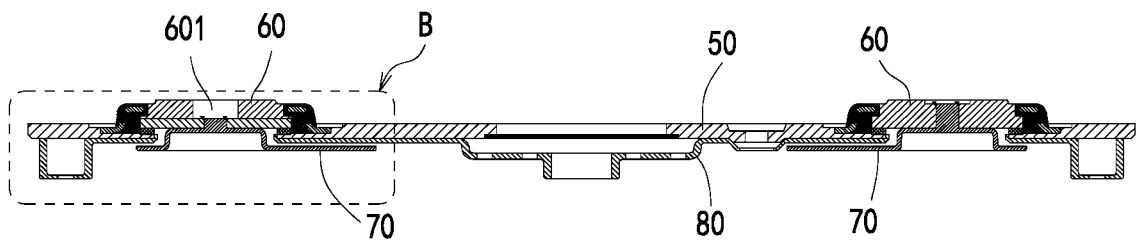
FIG. 6 schematically shows a cross-sectional view of a cap assembly according to the further embodiment of the present disclosure.
Figure 7:
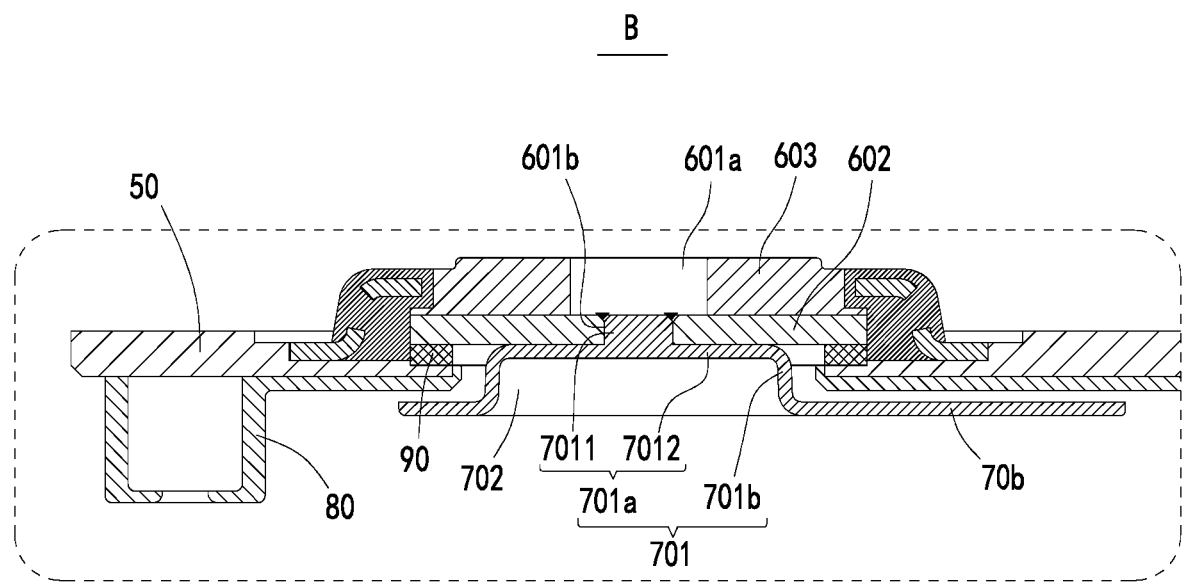
FIG. 7 schematically shows a partial enlarged view of portion B in FIG. 6.
Figure 8:
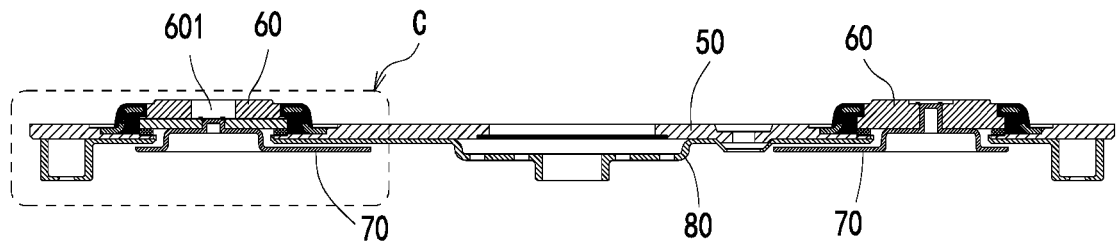
FIG. 8 schematically shows a cross-sectional view of a cap assembly according to a still further embodiment of the present disclosure.

FIG. 5 schematically shows a partial exploded view of a secondary battery according to an embodiment of the present disclosure. FIG. 6 schematically shows a cross-sectional view of a cap assembly according to an embodiment of the present disclosure. FIG. 7 schematically shows a partial enlarged view of portion B in FIG. 6. In FIGS. 5 to 7, the same elements as those shown in FIGS. 2 to 4 are denoted by the same reference numerals, wherein the description of the same configurations will not be repeated, and different configurations will be mainly described. Referring to FIGS. 5 to 7, the side portion 701b included in the extending portion 70a according to an embodiment of the present disclosure is formed in a cylindrical shape. The base portion 701a is connected to the side portion 701b, and is specifically connected to the side portion 701b in a sealed manner. The base portion 701a is directly connected to the electrode terminal 60. In one embodiment, the base portion 701a is welded to the electrode terminal 60, by which an annular welding seam is formed so as to connect the base portion 701a and the electrode terminal 60 in a sealed manner. Since the base portion 701a protrudes into the through hole 601 such that the base portion 701a of the current collecting member 70 is connected to the electrode terminal 60 by performing laser welding from the outer side of the cap plate 50, metal particles generated by the laser welding will not fall into the case 20, thereby preventing an internal short circuit due to conduction of the positive electrode plate and the negative electrode plate of the electrode assembly 30 caused by the metal particles, and thus effectively improving safety of the secondary battery 10.

The base portion 701a of the present embodiment includes a base body 7011 and an annular flange 7012 surrounding the base body 7011. The base body 7011 is connected to the side portion 701b by the annular flange 7012. The base body 7011 protrudes into the through hole 601 and is directly connected to the electrode terminal 60. The base body 7011 has an outer diameter smaller than that of the side portion 701b. The annular flange 7012 abuts against a surface of the electrode terminal 60 facing the electrode assembly 30.

In one embodiment, referring to FIG. 7, the base body 7011 is formed as a solid columnar member and has a high rigidity, such that the connection of the base body 7011 with the electrode terminal 60 is stable and reliable. In a further embodiment, referring to FIG. 8 and FIG. 9, the base body 7011 is formed as a hollow columnar member, which is advantageous for reducing the overall weight of the current collecting member 70 and improving the energy density of the secondary battery 10.

The connecting portion 70b according to an embodiment of the present disclosure is formed as a sheet-like member, which is advantageous for reducing an occupation ratio of the connecting portion 70b to the internal space of the case 20 and improving the energy density of the secondary battery 10. Since the tab 302 is formed as a sheet-like member, the tab 302 and the connecting portion 70b may be connected by ultrasonic welding, which may lower the possibility of occurrence of metal particles during the welding of the tab 302 and the connecting portion 70b. Moreover, a connection area between the tab 302 and the connecting portion 70b is relatively large, and thus the connection is reliable and stable. In one embodiment, referring to FIG. 2, the tab 302 includes a weld portion 302a and a bent portion 302b. The bent portion 302b is connected between the main body 301 and the weld portion 302a. The bent portion 302b is bent downward with respect to the weld portion 302a. Two groups of electrode assemblies 30 are provided, and each group of electrode assemblies 30 may include one electrode assembly, or two or more electrode assemblies 30. Each weld portion 302a of the two groups of electrode assemblies 30 is welded to the connecting portion 70b by ultrasonic welding, and the weld portion 302a of either one group of electrode assemblies 30 extends toward the weld portion 302a of the other group of electrode assemblies 30.

Figure 9:
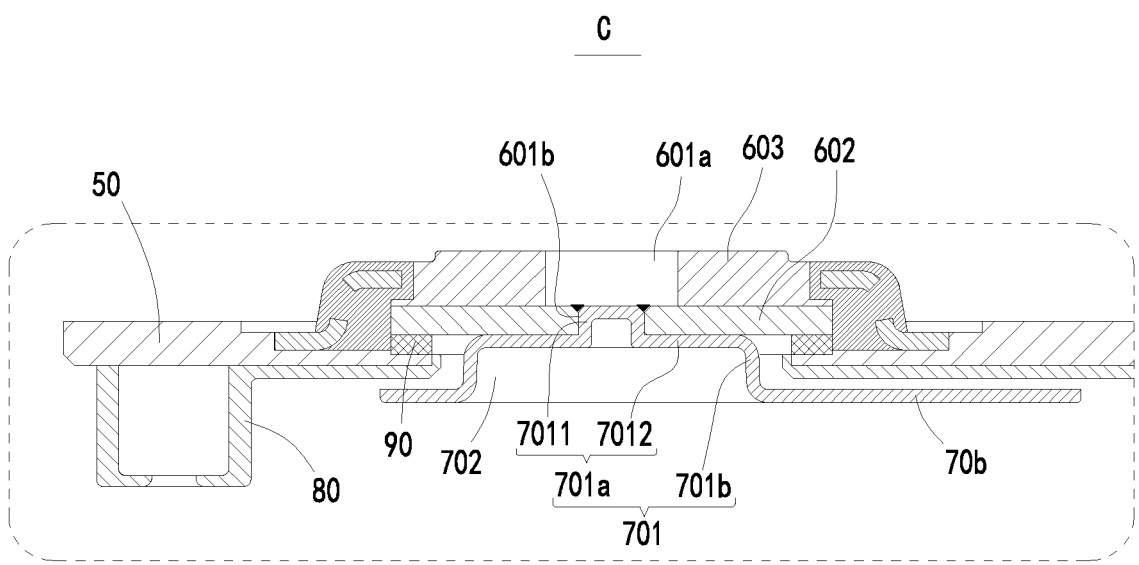
FIG. 9 schematically shows a partial enlarged view of portion C in FIG. 8.

In one embodiment, referring to FIG. 7 or FIG. 9, the electrode terminal 60 includes a second metal layer 602 and a first metal layer 603 stacked on the second metal layer 602. The through hole 601 is formed as a stepped hole including a first hole 601a and a second hole 601b. The first hole 601a has an aperture larger than that of the second hole 601b. The first hole 601a is disposed in the first metal layer 603, and the second hole 601b is disposed in the second metal layer 602. The extending portion 70a protrudes into the second hole 601b and is connected to the second metal layer 602. The first metal layer 603 and the second metal layer 602 are made of different materials, and the extending portion 70a is made of the same material as the second metal layer 602. Preferably, the first metal layer 603 is made of aluminum, and the second metal layer 602 and the extending portion 70a are made of copper. Since the extending portion 70a of the current collecting member 70 and the second metal layer 602 of the electrode terminal 60 are made of the same material, the extending portion 70a and the second metal layer 602 may be connected and fixed to each other by laser welding, and the welding connection is reliable, stable and has a high strength. In one example, the through hole 601 includes a stepped surface. A top surface of the extending portion 70a is flush with the stepped surface. When the extending portion 70a and the second metal layer 602 are connected and fixed to each other by laser welding, laser light is incident from the outer side of the cap plate 50 in a direction perpendicular to the stepped surface, melting the extending portion 70a and the second metal layer 602. Since the top surface of the extending portion 70a is flush with the stepped surface, a power requirement of a laser generating apparatus may be advantageously lowered.

The electrode terminal 60 according to the embodiment of the present disclosure is connected to the cap plate 50 and located on the outer side of the cap plate 50. The electrode assembly 30 is electrically connected to the electrode terminal 60 via the current collecting member 70. Since the electrode terminal 60 does not pass through the cap plate 50 and does not occupy the internal space of the case 20, a size of the electrode assembly 30 may be increased, which is advantageous for increasing the energy density of the secondary battery 10. Further, the tab 302 of the electrode assembly 30 is electrically connected to the electrode terminal 60 via the current collecting member 70. During assembly of the secondary battery 10, the tab 302 of the electrode assembly 30 may be first connected and fixed to the current collecting member 70 (preferably by ultrasonic welding); then, the extending portion 70a included in the current collecting member 70 is mounted to the through hole 601 of the electrode terminal 60, the electrode assembly 30 is further loaded into the case 20, and the cap plate 50 is coupled to the case 20; finally, laser light is irradiated from the outer side of the cap plate 50 such that the extending portion 70a and the electrode terminal 60 is connected by laser welding. As such, the possibility that metal particles generated during the laser welding of the extending portion 70a and the electrode terminal 60 fall into the inside of the case 20 may be reduced, and the internal short circuit of the electrode assembly 30 may be prevented.

Figure 10:
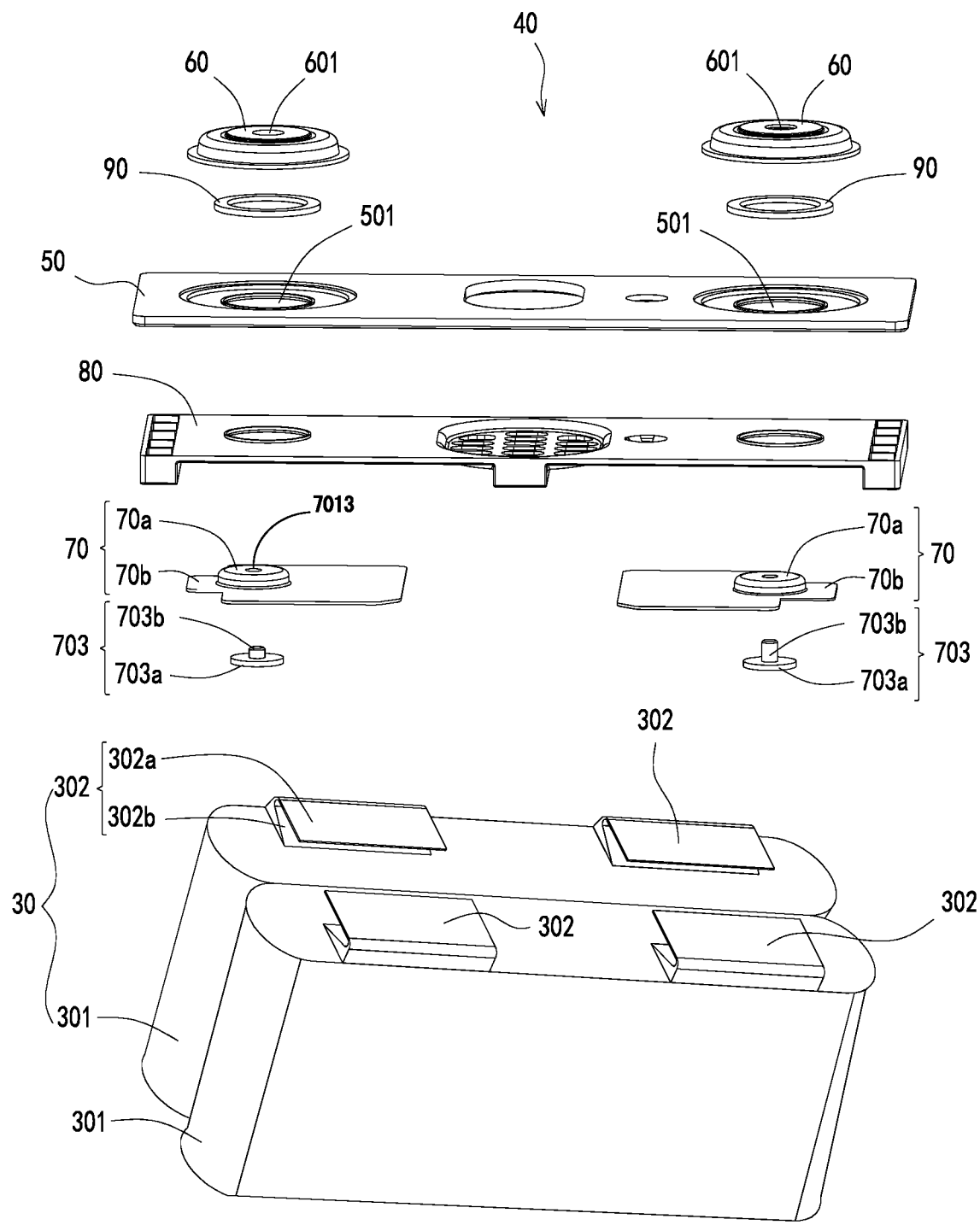
FIG. 10 schematically shows a partial exploded view of a secondary battery according to another embodiment of the present disclosure.
Figure 11:
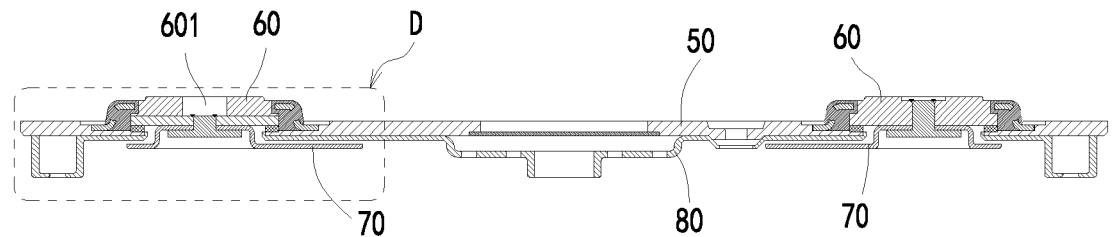
FIG. 11 schematically shows a cross-sectional view of a cap assembly according to the another embodiment of the present disclosure.
Figure 12:
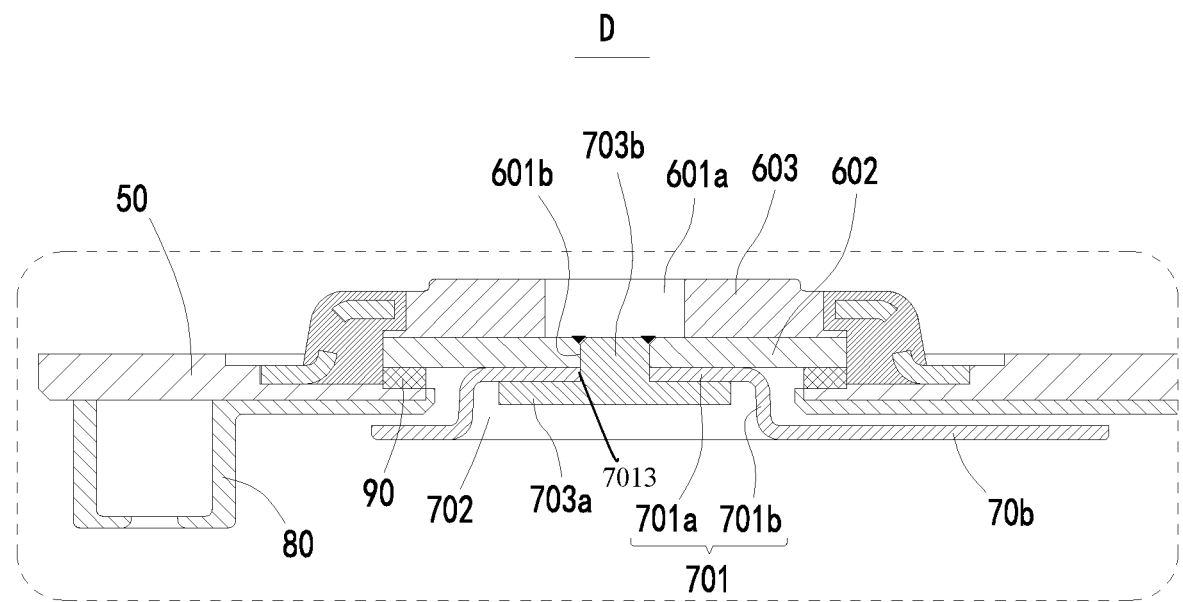
FIG. 12 schematically shows a partial enlarged view of portion D in FIG. 11.

FIG. 10 schematically shows a partial exploded view of a secondary battery according to an embodiment of the present disclosure. FIG. 11 schematically shows a cross-sectional view of a cap assembly according to an embodiment of the present disclosure. FIG. 12 schematically shows a partial enlarged view of portion D in FIG. 11. In FIGS. 10 to 12, the same elements as those shown in FIGS. 5 to 7 are denoted by the same reference numerals, wherein the description of the same configurations will not be repeated, and the different configurations will be mainly illustrated. Referring to FIGS. 10 to 12, the extending portion 70a further includes a connecting member 703. The base portion 701a is provided with a perforation hole 7013. The connecting member 703 passes through the perforation hole 7013 and is connected to the base portion 701a. The connecting member 703 protrudes into the through hole 601 so as to be exposed to a side of the electrode terminal 60 facing away from the cap plate 50. The connecting member 703 is directly connected to the electrode terminal 60. Preferably, the connecting member 703 and the electrode terminal 60 are connected by laser welding. The connecting member 703 and the base portion 701a may be made of the same material or different materials. The connecting member 703 of the present embodiment includes a support portion 703a and a column body 703b connected to the support portion 703a. The support portion 703a is received in the recess 702 and extends beyond an inner wall of the perforation hole 7013 in a radial direction of the perforation hole 7013. The column body 703b passes through the perforation hole 7013 and protrudes into the through hole 601. The column body 703b is directly connected to the electrode terminal 60. Preferably, the column body 703b and the electrode terminal 60 are connected by laser welding. During the laser welding, laser light is incident from an outer side of the cap plate 50, and thus metal particles generated during laser welding may be effectively prevented from falling into the case 20. After the column body 703b is connected and fixed to the electrode terminal 60, the support portion 703a may tightly pull the base portion 701a upward, and the base portion 701a may be clamped by the support portion 703a and the electrode terminal 60 to maintain a stable position. In one embodiment, the support portion 703a is formed as a disk-like member.

The base portion 701a of the present embodiment is clamped between the electrode terminal 60 and the support portion 703a. The base portion 701a is in direct contact with the electrode terminal 60. The base portion 701a is in direct contact with the support portion 703a. After the column body 703b is connected and fixed to the electrode terminal 60, the support portion 703a may directly and tightly pull the base portion 701a upward so that the base portion 701a is tightly attached to a surface of the electrode terminal 60 facing the electrode assembly 30.

Figure 13:
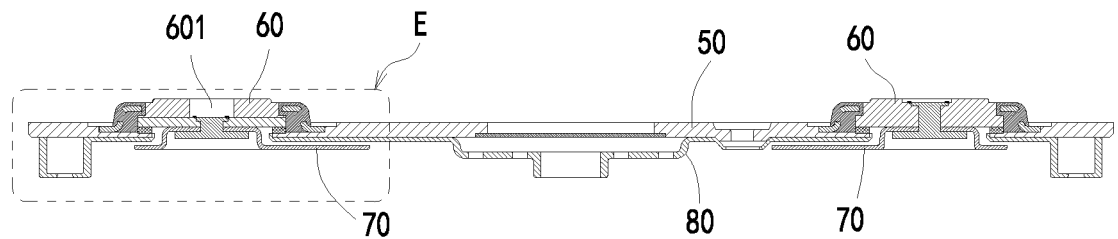
FIG. 13 schematically shows a cross-sectional view of a cap assembly according to a still another embodiment of the present disclosure.
Figure 14:
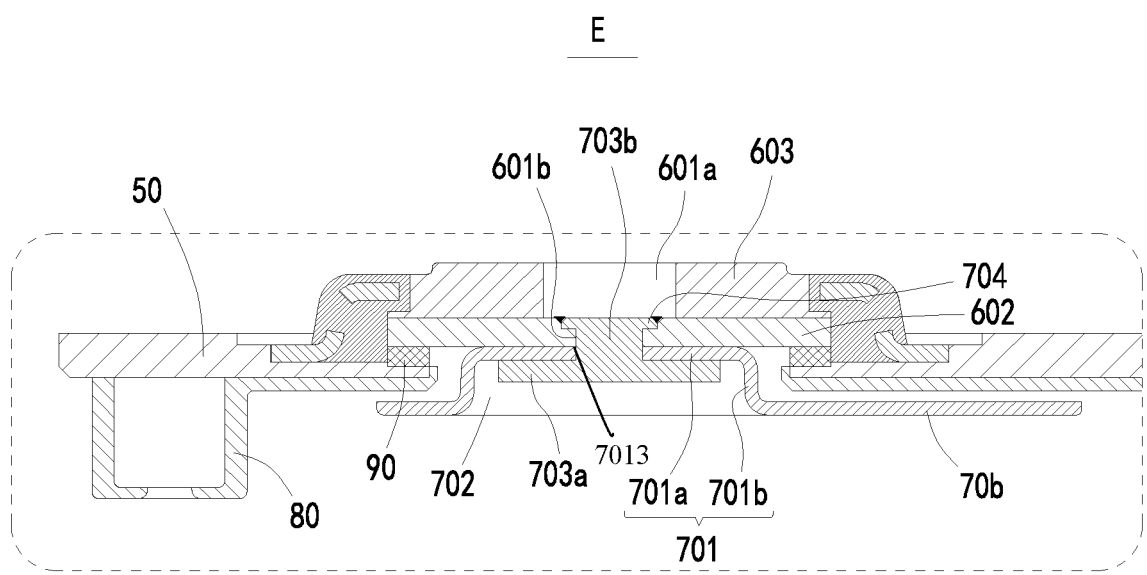
FIG. 14 schematically shows a partial enlarged view of portion E in FIG. 13.

The column body 703b of the present embodiment is welded to the electrode terminal 60 (preferably by laser welding), by which an annular welding seam is formed so as to connect the column body 703b and the electrode terminal 60 in a sealed manner, and prevent leakage of the electrolyte or gas. Referring to FIGS. 13 and 14, the connecting member 703 further includes an annular body 704 surrounding the column body 703b. The annular body 704 is disposed at an end of the column body 703b away from the support portion 703a. The connecting member 703 is connected to the electrode terminal 60 in a sealed manner by the annular body 704. By providing the annular body 704, a connection strength and connection stability of the connecting member 703 and the electrode terminal 60 may be effectively increased, and a possibility that the connecting member 703 and the electrode terminal 60 are disconnected from each other may be lowered. In one embodiment, the annular body 704 is an independent member separated from the column body 703b. The annular body 704 is sleeved on the end of the column body 703b, and is connected and fixed to the column body 703b by welding. In a further embodiment, the annular body 704 and the column body 703b are integrally formed. The annular body 704 is formed by applying an external force to an end of the column body 703b passing through the through hole 601 and physically deforming the end of the column body 703b. In one example, the annular body 704 is welded to the electrode terminal 60.

Figure 15:
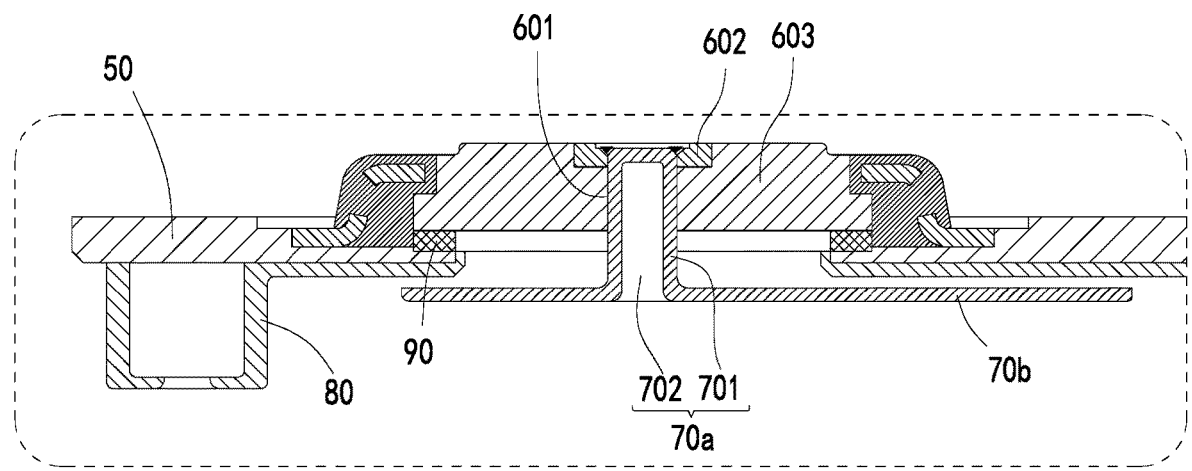
FIG. 15 schematically shows a partial cross-sectional view of a cap assembly according to a further embodiment of the present disclosure.

FIG. 15 schematically shows a cross-sectional view of a cap assembly according to a further embodiment of the present disclosure. In FIG. 15, the same elements as those shown in FIGS. 2 to 4 are denoted by the same reference numerals, wherein the description of the same configurations will not be repeated, and the different configurations will be mainly illustrated. Referring to FIG. 15, the electrode terminal of the present embodiment includes a first metal layer 603 and a second metal layer 602. The first metal layer 603 is provided with a groove on an upper surface, and the second metal layer 602 is disposed in the groove and connected to the first metal layer 603. The first metal layer 603 is closer to the cap plate 50 than the second metal layer 602. The first metal layer 603 and the second metal layer 602 are made of different materials. The extending portion 70a is connected and fixed to the second metal layer 602 after protruding into the through hole 601. The extending portion 70a and the second metal layer 602 are made of the same material. The first metal layer 603 and the second metal layer 602 of the present embodiment may be formed as an integral member by a composite process.

In one embodiment, the first metal layer 603 is made of aluminum, and the second metal layer 602 is made of copper. The extending portion 70a is made of copper, and thus, it is easy for the extending portion 70a and the second metal layer 602 to be connected by laser welding and obtain a high welding connection strength.

Referring to FIG. 16, an embodiment of the present disclosure further discloses a method of manufacturing a secondary battery 10, wherein the method includes the following steps:

providing an electrode assembly 30, wherein the electrode assembly 30 includes a main body 301 and a tab 302 connected to the main body 301;

providing a current collecting member 70 including an extending portion 70a and a connecting portion 70b connected to the extending portion 70a, and directly connecting the tab 302 to the connecting portion 70b;

providing a cap plate 50 and an electrode terminal 60 disposed on an outer side of the cap plate 50 and provided with a through hole 601, and inserting the extending portion 70a into the through hole 601 from an inner side of the cap plate 50; and providing a case 20, loading the electrode assembly 30 into the case 20, and then performing laser welding on the outer side of the cap plate 50 to connect the extending portion 70a and the electrode terminal 60.

In one embodiment, the tab 302 and the connecting portion 70b are connected and fixed by ultrasonic welding to lower a possibility of generation of metal particles during the welding process, which is advantageous for improving safety of the secondary battery 10.

In the method of manufacturing the secondary battery 10 according to the embodiment of the present disclosure, the current collecting member 70 and the tab 302 are connected and fixed to each other at first, and then the current collecting member 70 and the electrode terminal 60 are assembled with each other and the electrode assembly 30 is loaded into the case 20. Finally, laser welding is performed on the outer side of the cap plate 50 to connect and fix the extending portion 70a included in the current collecting member 70 to the electrode terminal 60. Thus, metal particles generated during the laser welding process of the extending portion 70a of the current collecting member 70 and the electrode terminal 60 will not fall into the inside of the case 20, thereby effectively ensuring a cleanliness of an internal space of the case 20, and lowering a possibility of occurrence of a short circuit of the electrode assembly 30.

In one embodiment, the extending portion 70a and the electrode terminal 60 are welded in a sealed manner, to ensure a stable connection between the extending portion 70a and the electrode terminal 60 with a high connection strength. In one example, the extending portion 70a and the electrode terminal 60 are connected in a sealed manner by laser welding.

In one embodiment, the extending portion 70a is interference-fitted with the through hole 601. Therefore, before the extending portion 70a and the electrode terminal 60 are connected and fixed to each other, it is not easy for the extending portion 70a to fall off from the through hole 601 or displace in the through hole 601, thereby ensuring a connection stability of the current collecting member 70 and the electrode terminal 60 during assembly of the secondary battery 10, which is advantageous for improving an efficiency of the following connecting and fixing operation of the extending portion 70a included in the current collecting member 70 and the electrode terminal 60. Further, since the extending portion 70a is interference-fitted with the through hole 601, there is no gap between the extending portion 70a and the electrode terminal 60.

Although the present disclosure has been described with reference to the preferred embodiments, various modifications may be made to the present disclosure and components may be replaced with equivalents without departing from the scope of the present disclosure. In particular, the technical features mentioned in the various embodiments may be combined in any manner as long as there is no structural conflict. The present disclosure is not limited to the specific embodiments disclosed herein, but includes all technical solutions falling within the scope of the claims.

What is claimed is:

1. A secondary battery, comprising:
   a case;
   an electrode assembly, accommodated in the case and comprising a main body and a tab connected to the main body;
   a cap plate, coupled to the case;
   an electrode terminal, provided with a through hole; and
   a current collecting member, comprising an extending portion and a connecting portion connected to the extending portion, wherein the connecting portion is located on an inner side of the cap plate and is directly connected to the tab, and the extending portion is adapted to extend toward the electrode terminal and protrude into the through hole, wherein the electrode terminal is entirely located on an outer side of the cap plate, and the extending portion is connected to the electrode terminal by welding in a sealed manner, wherein the extending portion comprises a projection and a recess, wherein the projection is connected to the connecting portion, and the recess is formed on a side of the projection facing away from the electrode terminal by forming the projection, wherein the projection comprises a base portion and a side portion, wherein the side portion is connected to the connecting portion and is adapted to extend toward the electrode terminal, and the base portion is connected to one end of the side portion away from the connecting portion, and is adapted to protrude into the through hole and is connected to the electrode terminal, wherein the base portion comprises a base body and an annular flange connected between the side portion and the base body, wherein the base body is adapted to protrude into the through hole, and is directly connected to the electrode terminal with the annular flange abutting against the electrode terminal.

2. The secondary battery according to claim 1, wherein the side portion is formed in a cylindrical shape and is connected to the base portion in a sealed manner, and the base portion is directly connected to the electrode terminal.

3. The secondary battery according to claim 1, wherein the base portion is welded to the electrode terminal, by which an annular welding seam is formed to connect the base portion and the electrode terminal in a sealed manner.

4. The secondary battery according to claim 2, wherein the base portion is welded to the electrode terminal, by which an annular welding seam is formed to connect the base portion and the electrode terminal in a sealed manner.

5. The secondary battery according to claim 2, wherein the base portion comprises a base body and an annular flange connected between the side portion and the base body, wherein the base body is adapted to protrude into the through hole, and is directly connected to the electrode terminal with the annular flange abutting against the electrode terminal.

6. The secondary battery according to claim 5, wherein the base portion comprises a base body and an annular flange connected between the side portion and the base body, wherein the base body is adapted to protrude into the through hole, and is directly connected to the electrode terminal with the annular flange abutting against the electrode terminal.

7. The secondary battery according to claim 1, wherein the projection comprises a base portion and a side portion, wherein the side portion is connected to the connecting portion and is adapted to extend toward the electrode terminal, and the base portion is connected to one end of the side portion away from the connecting portion; and the extending portion further comprises a connecting member, wherein the base portion is provided with a perforation hole, the connecting member is adapted to pass through the perforation hole and connect to the base portion, and is further adapted to protrude into the through hole and is directly connected to the electrode terminal.

8. The secondary battery according to claim 7, wherein the connecting member comprises a support portion and a column body connected to the support portion, wherein the support portion is received in the recess of the extending portion and is adapted to extend beyond an inner wall of the perforation hole in a radial direction of the perforation hole, and the column body is adapted to pass through the perforation hole and protrude into the through hole, and is directly connected to the electrode terminal.

9. The secondary battery according to claim 8, wherein the base portion is in direct contact with the electrode terminal, and in direct contact with the support portion.

10. The secondary battery according to claim 8, wherein the column body is welded to the electrode terminal, by which an annular welding seam is formed to connect the column body and the electrode terminal in a sealed manner.

11. The secondary battery according to claim 1, wherein the connecting portion is formed as a sheet-like member, and is connected to the tab by ultrasonic welding; and the extending portion is connected to the electrode terminal by laser welding.

12. The secondary battery according to claim 11, wherein the tab comprises a weld portion and a bent portion, wherein the bent portion is connected between the main body of the electrode assembly and the weld portion, and is bent downward with respect to the weld portion; and the secondary battery comprises two groups of electrode assemblies, wherein each weld portion of the two groups of electrode assemblies is welded to the connecting portion of the current collecting member by ultrasonic welding, and the weld portion of either one of the two groups of electrode assemblies is adapted to extend toward the weld portion of the other group of the electrode assembly.

13. The secondary battery according to claim 1, wherein, the electrode terminal comprises a second metal layer and a first metal layer stacked on the second metal layer, and the through hole is formed as a stepped hole comprising a first hole and a second hole, wherein the first hole has an aperture larger than that of the second hole, the first hole is disposed in the first metal layer, and the second hole is disposed in the second metal layer; and the extending portion and the second metal layer are made of the same material, the first metal layer and the second metal layer are made of different materials, and the extending portion is adapted to protrude into the second hole and is connected to the second metal layer.

14. The secondary battery according to claim 13, wherein the through hole comprises a stepped surface, and a top surface of the extending portion is flush with the stepped surface.

15. The secondary battery according to claim 1, wherein the electrode terminal comprises a first metal layer and a second metal layer, wherein the first metal layer is provided with a groove on an upper surface, and the second metal layer is disposed in the groove and connected to the first metal layer; and the first metal layer and the second metal layer are made of different materials, and the extending portion is connected to the second metal layer and has the same material as the second metal layer.

16. The secondary battery according to claim 13, wherein the first metal layer is made of aluminum, the second metal layer is made of copper, and the extending portion is made of copper.

17. A method of manufacturing a secondary battery, comprising the steps of:

providing an electrode assembly, wherein the electrode assembly comprises a main body and a tab connected to the main body;

providing a current collecting member, wherein the current collecting member comprises an extending portion and a connecting portion connected to the extending portion, and the tab is directly connected to the connecting portion;

providing a cap plate and an electrode terminal, wherein the electrode terminal is provided with a through hole, and the extending portion is adapted to protrude into the through hole from an inner side of the cap plate; and providing a case, loading the electrode assembly into the case, and then performing laser welding on the outer side of the cap plate to connect the extending portion and the electrode terminal, wherein the electrode terminal is entirely located on an outer side of the cap plate, and the extending portion and the electrode terminal are connected in a sealed manner by the laser welding, wherein the extending portion comprises a projection and a recess, wherein the projection is connected to the connecting portion, and the recess is formed on a side of the projection facing away from the electrode terminal by forming the projection, wherein the projection comprises a base portion and a side portion, wherein the side portion is connected to the connecting portion and is adapted to extend toward the electrode terminal, and the base portion is connected to one end of the side portion away from the connecting portion, and is adapted to protrude into the through hole and is connected to the electrode terminal, wherein the base portion comprises a base body and an annular flange connected between the side portion and the base body, wherein the base body is adapted to protrude into the through hole, and is directly connected to the electrode terminal with the annular flange abutting against the electrode terminal.

* * * * *